Patented Mar. 6, 1951

2,544,291

UNITED STATES PATENT OFFICE 2,544,291

ALKALOID MANUFACTURE

Manuel Mannheim Baizer, Flushing, N. Y., assignor to New York Quinine and Chemical Works, Incorporated, Brooklyn, N. Y., a corporation of New York No Drawing. Application April 5, 1949,
Serial No. 85,729

3 Claims. (Cl. 260—285)

My invention relates to an improvement in the manufacture of dihydrocodeinone and its bitartrate from codeine.

These substances are usually made from thebaine which occurs in opium to the extent of only 0.1 to 1% (Henry, The Alkaloids, 1939, 221). They can be prepared, although much less conveniently, from codeine. This alkaloid occurs in opium in amounts of up to 3% (Henry, l. c., 208), and can be made from morphine of which opium "contains not less than 9.5% anhydrous" (Pharmacopoeia of the United States, Thirteenth edition). It is therefore desirable to use codeine as a supplementary source for the production of dihydrocodeinone and its bitartrate.

Dihydrocodeinone bitartrate in order to be acceptable for medical use must be substantially free from codeine. When tested with ferric chloride T. S. in sulfuric acid solution, this solution must not change in color when heated (New and Non-official Remedies, Journal of the American Medical Association 138, 820, November 13, 1948), in distinction from codeine which gives a purple color.

As far as I am aware, no dihydrocodeinone bitartrate made from codeine is being offered on the market today. The problems of freeing this substance from codeine and otherwise operating the manufacturing process economically seem not to have been solved as yet.

It is an object of my invention to develop an improved process for the manufacture of dihydrocodeinone and its bitartrate which yields a substantially codein-free material in a simple, convenient and economically feasible manner.

Previous attempts have employed the principle of purifying crude dihydrocodeinone prepared from codeine by recrystallization from a suitable solvent such as alcohol, until the melting point of the dihydrocodeinone indicated that the substance was substantially pure. This procedure is definitely troublesome and expensive The necessary recovery of the alkaloid from the mother liquors of recrystallization is difficult, and many recrystallization steps are necessary to obtain the purified dihydrocodeinone. For practical purposes this method has little to recommend it.

I have found that a combination of steps which to the best of my knowledge has not heretofore been described in this art, gives much superior results and enables me, for the first time in my experience, to employ codeine successfully as an initial source in the commercial preparation of dihydrocodeinone and its bitartrate.

In my new method, codeine is first rearranged into dihydrocodeinone by treatment with palladium catalyst. I have found that the form of the catalyst is essential. Thus the use of a supported palladium catalyst which has not been described before has definite practical advantages. It is more convenient to handle than palladium black heretofore customarily employed, it is readily available in commerce, and it greatly increases the efficiency of the process due to its larger surface area and saving of catalyst. Supported palladium catalyst such as palladium on pumice or alumina, or 1% palladium on charcoal can be used. I prefer 5% palladium charcoal.

Next, the crude dihydrocodeinone is isolated from the catalytic reaction mixture and is then purified to remove unreacted codeine. I have found that purification can easily be accomplished by passing the crude product dissolved in a suitable solvent over an adsorbent such as activated alumina. The dihydrocodeinone passes through this column at an appreciably faster rate than codeine. Thus when the latter finally appears in the effluent and the end point of the separation has been reached, a large quantity of a substantially codeine-free dihydrocodeinone has been separated from the codeine, as will be more clearly shown in the attached examples. As far as I am aware, there was no way of knowing that the passage of the two substances through the adsorbent would be as highly differential as I have discovered it to be. This very convenient separation procedure stands in marked contrast to the uneconomical separation by recrystallization.

I have also found that halogenated aliphatic hydrocarbons are highly efficient solvents. I can use chloroform, trichlorethylene, tetrachlorethane, or fluorinated hydrocarbons such as a mixture of chlorofluoroethanes boiling at about 70° C. My preferred solvent is ethylene chloride. Solvents such as acetone have proven much less satisfactory.

Finally, dihydrocodeinone bitartrate is directly precipitated from the effluent of the adsorption, for instance ethylene chloride, by the addition of tartaric acid dissolved in a suitable solvent such as hydroalcoholic solution. I have found that this procedure gives a virtually white product even if the liquor is yellow. Other precipitation procedures that I have tried such as the use of solid tartaric acid, addition of aqueous tartaric acid to an ethylene chloride acetone solution of the alkaloid, tend to include color in the product.

An additional step which has not been described before and which further increases the efficiency of my new process is the recycling of material obtained from certain mother liquors through the rearrangement step. I have found that this recycling gives rearrangement virtually equal to that which is obtained when only codeine is employed as the starting material.

Operational details of these various steps of my new process are described in the attached examples. I have found that the process is highly efficient. It saves a great deal of time and yet it yields a dihydrocodeinone bitartrate of superior purity to the best grade that is obtainable economically by the recrystallization method. To my knowledge it is the first practically feasible method for the manufacture of the bitartrate of NNR purity that has been developed.

The following examples illustrate my invention:

Conversion of codeine to dihydrocodeinone

*Rearrangement.*—Sixty grams of codeine about 94.5% (anhydrous codeine alkaloid basis) are dissolved in a solution made from 10 ml. concentrated sulfuric acid and 390 ml. water. The mixture is refluxed for one hour with 25.0 grams of 5% palladium on charcoal. The hot solution is immediately filtered, and the catalyst is washed with 400 ml. of dilute sulfuric acid of the same strength as was used in the rearrangement described above.

*Isolation.*—To the combined cooled filtrate and wash, 750 ml. of benzene (not necessarily thiophene-free) are added, after which the mixture is cooled to 15°, stirred, and made alkaline to pH 10 by the addition of ca. 80 ml. of 40% NaOH. After shaking and separating the aqueous layer is extracted twice with 500 ml. benzene. The combined benzene extracts are then extracted three times with 500 ml. and twice with 400 ml. portions of fresh 10% sodium bisulfite solution. Crude dihydrocodeinone is precipitated from the bisulfite solution by the addition of ca. 180 ml. 40% NaOH at 15° (to pH 10). The product is filtered, washed well and air-dried at room temperature. The melting point is about 184° C. and the yield ca. 35–38 g. or 58–59%.

Instead of using codeine alkaloid, I can also employ codeine sulfate and adjust the acidity of the rearrangement solution to that shown above.

The catalyst may be re-used once but not more often economically. The crude dihydrocodeinone should not be dried at an elevated temperature since it will darken and the colored impurities will interfere with the subsequent steps.

Purification of crude dihydrocodeinone

*Adsorbent.*—A column of "Alumina F-20" is prepared as follows: a plug of absorbent cotton is placed near the bottom of a glass tube measuring 3/4 in. in diameter and 22 in. in length. Small portions of alumina are added and levelled off by gentle rapping on the outside of the tube. This procedure is followed until the column of absorbent measures 10 in.; a plug of clean absorbent cotton is placed in the alumina. Weight of $Al_2O_3$=65 g. Pure dry ethylene chloride is allowed to run through the column until it emerges from the bottom. The column is now ready for use.

In order to determine the capacity of the adsorbent for the alkaloids, the crude dry dihydrocodeinone is dissolved in pure dry ethylene chloride, using 9 ml. per gram. (The volume of solution is ca. 380 ml.) The solution is allowed to run by gravity through the column (time=1½ hrs.) and the effluent is collected in a clean dry container (A). When the entire quantity of original solution has been passed through the column, 100 ml. of fresh ethylene chloride are passed through the column and collected separately (B). Next 250 ml. of acetone are passed through the column and collected in (C). To this point ca. 95% of the alkaloid originally put into the column has been eluted.

*Purification.*—The weight of crude dihydrocodeinone obtained in the above conversion was dissolved in ethylene dichloride and passed through the column of alumina as indicated but was collected in two containers, the first holding the first 2/3 of the effluent (a) and the second holding the final 1/3 (b). The bitartrate made from (a) when tested with $H_2SO_4$ and $FeCl_3$ by the NNR procedure underwent no color change at all, the bitartrate made from (b) changed under these conditions from light-yellow to a darker yellow. No green, blue or violet color was produced. When samples of the bitartrates made from (a) and (b) were mixed and subjected to the $H_2SO_4$—$FeCl_3$ test, there was again a slight darkening of shade.

There is no doubt that (a) is codeine-free under the aforementioned NNR test. If (b) is considered unsatisfactory, an adjustment in column size can be made in order to retain more of the codeine, or only that amount of effluent which is definitely codeine-free can be collected, the remainder being recycled through the rearrangement step as described further below.

*Recovery.*—Finally, the aluminum oxide is removed from the column, and freed from the adhering alkaloids as follows: It is slurried with 100 ml. of 10% acetic acid and filtered. The filtrate is brought to pH 10 by addition of 40% NaOH and extracted with 2 x 50 ml. of thiophene-free benzene. The benzene extract is washed, dried and distilled to dryness under gentle heat, using vacuum near the end. The residue amounting to about 2% of the alkaloid input can be recycled in the next rearrangement. The aluminum oxide can be reactivated upon ignition, but must first be washed free of acetic acid.

Conversion to bitartrate

A hydro-alcoholic solution of tartaric acid is made from 50 grams tartaric acid U. S. P., 480 cc. absolute alcohol, 15 cc. water. Of this solution, 15.9 cc. contains 1.5 g. tartaric acid, equivalent to 3.0 g. dihydrocodeinone.

A measured weight or volume, for instance 10 cc., of the (A) fraction described above under "Adsorbent" and containing purified dihydrocodeinone in ethylene chloride solution is reduced to dryness and from the weight of residue the volume of tartaric acid solution which must be added to provide 1 gm. tartaric acid: 2 gms. dihydrocodeinone is calculated. The addition is done at room temperature with good stirring. The reaction mixture is refrigerated at 5–10° C. for ca. 12 hours. The dihydrocodeinone bitartrate is then filtered and slurry-washed once with pure ethylene dichloride. The wash is combined with the original mother liquor (D). The product is dried until a sample shows by analysis the proper moisture content of two and one-half molecules of water.

Liquid (D) is then diluted with an equal volume of water and 40% NaOH to pH 10 is added. After shaking the layers are separated, and the caustic solution is extracted once with ethylene dichloride and the organic layers are combined. The ethylene dichloride solution is washed with water, separated, dried and distilled under gentle heat to dryness using vacuum near the end. The residue is dissolved in the dilute sulfuric acid used for the next rearrangement and added to the rearrangement liquor.

In the rearrangement reaction described above the following materials are formed in addition to dihydrocodeinone: dihydrocodeine, codeinone, and alkali-soluble thebainones. In my workup procedure a maximum of 70% of the codeine input is accounted for as dihydrocodeinone, including recoveries from the dihydrocodeinone liquors. The remainder of the input has gone into the formation of the by-products which are side-tracked. Of the 70% material which is accounted for, 95% eventually becomes pure dihydrocodeinone bitartrate.

I have found that the efficiency of my new process is further enhanced if certain precautions are observed in the performance.

It will be desirable, in judging the efficiency of a new column, to test the effluent for presence or absence of codeine, so that the maximum amount of solution can be put through for conversion to acceptable bitartrate. A simple test is made as follows. About 0.3 ml. of the effluent is collected in a test tube. The tube is immersed to the lip in boiling water and simultaneously evacuated. The evaporation is completed in 30–60 secs. To the dry residue is added 5 ml. of conc. $H_2SO_4$ and one drop of $FeCl_3$ T. S. The tube is shaken until the alkaloid has largely dissolved and is then heated 2–3 minutes on a steam bath. The color changes are noted. If no green, blue or purple color is developed and sample contains so little codeine that when it is converted to bitartrate the test will be negative.

The bitartrate should be made on the same day that the effluent from the $Al_2O_3$ column is collected. Ethylene dichloride solutions of dihydrocodeinone darken on standing.

*Recycling*

The procedure used here is similar to the operation described above under "Rearrangement." The charge of fresh codeine is 60 g. The amount of dilute sulfuric acid and palladium-charcoal is increased proportionately to the weight of the recovered material, counted as codeine, which is being recycled along with the fresh codeine.

What I claim is:

1. An improved method for the manufacture of codeine-free dihydrocodeinone from crude codeine which comprises heating the crude base in dilute acid solution in the presence of supported palladium catalyst, cooling the filtered reaction mixture, making it alkaline and extracting the crude dihydrocodeinone from it with an organic solvent, then extracting it from the organic solvent solution with sodium bisulfite solution, making the extract alkaline, filtering off the precipitated crude dihydrocodeinone, washing and drying it, dissolving it in a halogenated aliphatic hydrocarbon, fractionating the solution by passing it over aluminum oxide whereby an effluent containing codeine-free dihydrocodeinone is obtained, and recycling the remaining portion of the effluent through the process.

2. An improved method for the manufacture of codeine-free dihydrocodeinone from crude codeine which comprises heating at approximately reflux temperature the crude base dissolved in dilute sulfuric acid in the presence of 5% palladium charcoal, cooling the filtered reaction mixture, making it alkaline, and extracting the crude dihydrocodeinone from it with benzene, then extracting it from the benzene solution with sodium bisulfite solution, making the extract alkaline, filtering off the precipitated crude dihydrocodeinone, washing and drying it, dissolving it in ethylene dichloride, fractionating the solution by passing it over aluminum oxide whereby an effluent containing the codeine-free dihydrocodeinone is obtained, and recycling the remaining portion of the effluent through the process.

3. An improved method for the manufacture of codeine-free dihydrocodeinone from crude codeine which comprises refluxing for one hour sixty grams of codeine of about 94.5% anhydrous codeine alkaloid basis with 25.0 grams of 5% palladium on charcoal in a solution made from 10 ml. of concentrated sulfuric acid and 390 ml. of water, cooling the filtered reaction mixture, making it alkaline and extracting the crude dihydrocodeinone from it with benzene, then extracting it from the benzene solution with sodium bisulfite solution, making the extract alkaline, filtering off the precipitated crude dihydrocodeinone, washing and drying it, dissolving it in ethylene dichloride, fractionating the solution by passing it over aluminum oxide whereby an effluent containing the codeine-free dihydrocodeinone is obtained, and recycling the remaining portion of the effluent through the process.

MANUEL MANNHEIM BAIZER.

REFERENCES CITED

The following references are of record in the file of this patent:

UNITED STATES PATENTS

| Number | Name | Date |
|---|---|---|
| 2,359,260 | Szabo | Sept. 26, 1944 |

FOREIGN PATENTS

| Number | Country | Date |
|---|---|---|
| 607,931 | Germany | Jan. 11, 1935 |
| 617,238 | Germany | Oct. 2, 1935 |

OTHER REFERENCES

Zechmeister et al., Principles and Practice of Chromatography (John Wiley and Sons, New York, 1941), page 236.

Quarendon, Manuf. Chemist and Manuf. Perfumer, vol 14, pp. 251–254 (1943).

J. Am. Med. Assoc., vol. 138, page 820 (1948).